Sept. 23, 1969  C. A. MATTSON  3,468,108
LAWN MOWER

Filed July 5, 1966  5 Sheets-Sheet 1

INVENTOR
CHARLES A. MATTSON
by George R. Clark
ATTORNEY

Sept. 23, 1969   C. A. MATTSON   3,468,108
LAWN MOWER
Filed July 5, 1966   5 Sheets-Sheet 2
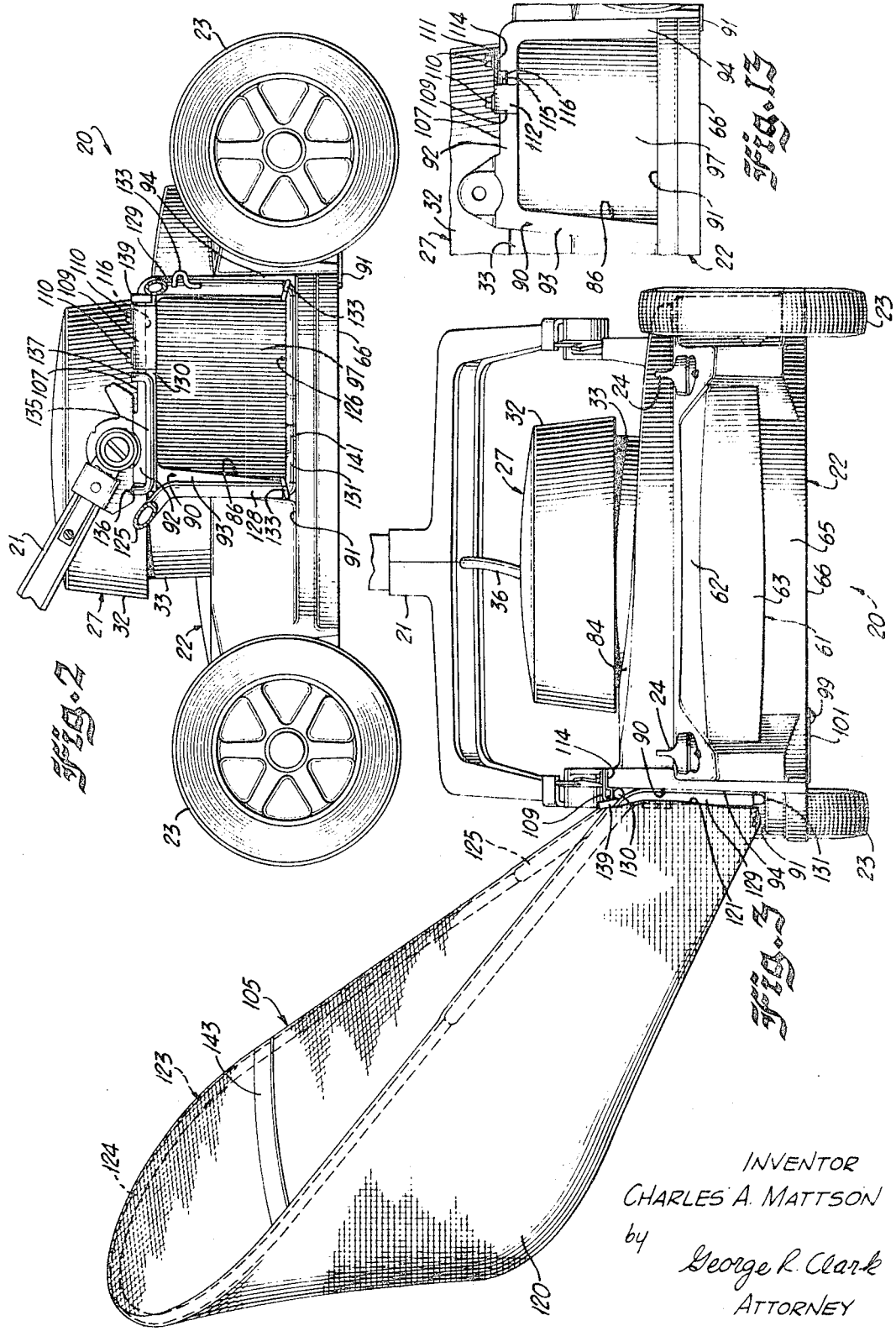
INVENTOR
CHARLES A. MATTSON
by
George R. Clark
ATTORNEY INVENTOR
CHARLES A. MATTSON
by George R. Clark
ATTORNEY Sept. 23, 1969　　　　C. A. MATTSON　　　　3,468,108
LAWN MOWER
Filed July 5, 1966　　　　　　　　　　　　5 Sheets-Sheet 4
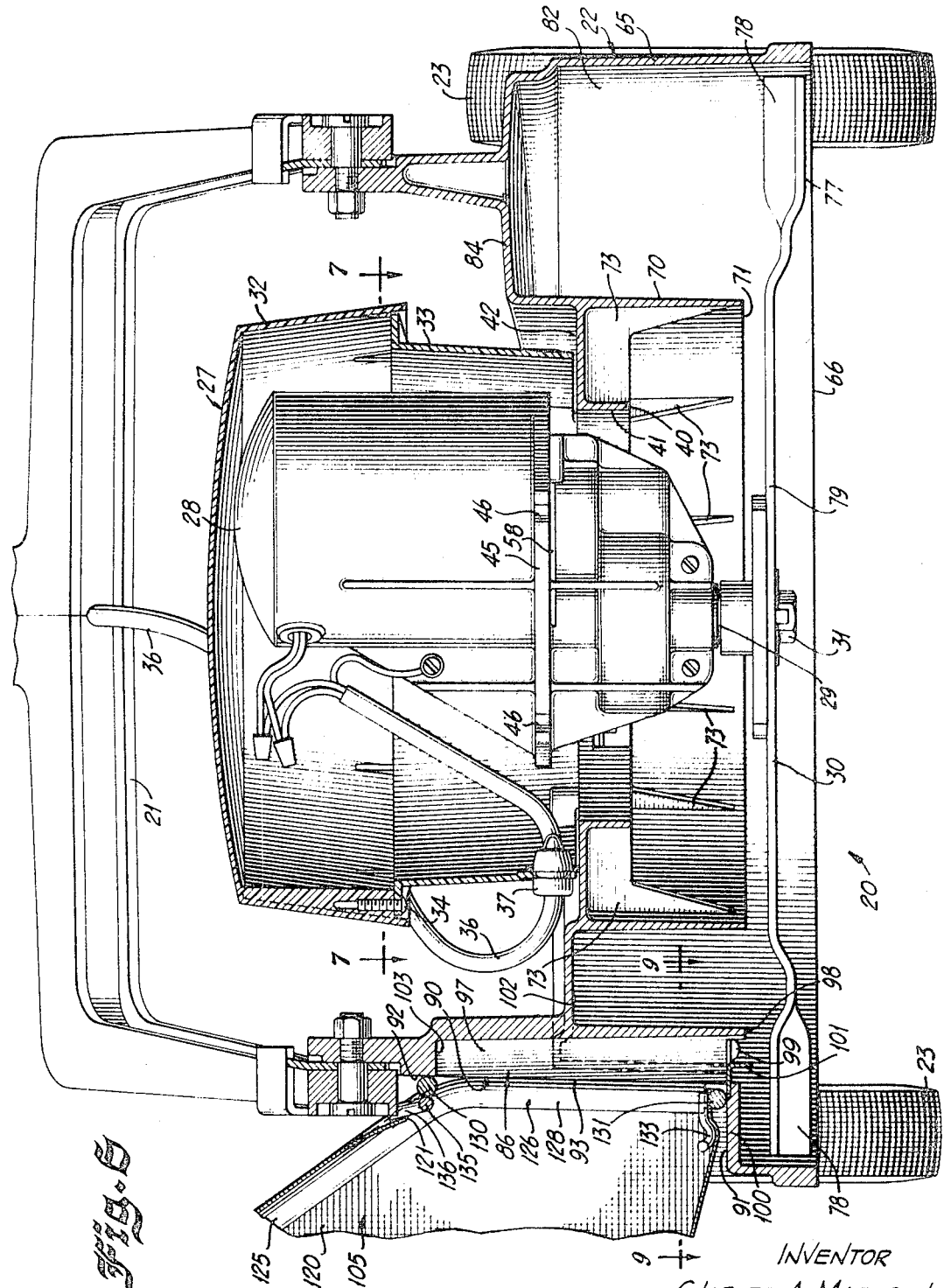
INVENTOR
CHARLES A. MATTSON
by George R. Clark
ATTORNEY

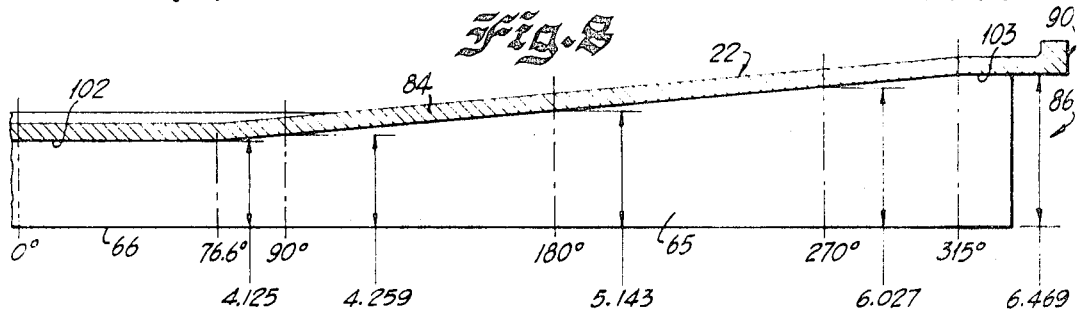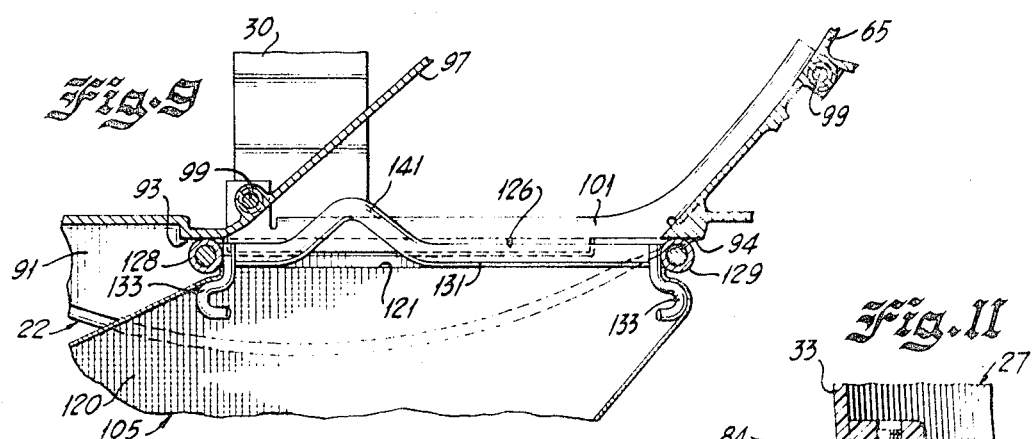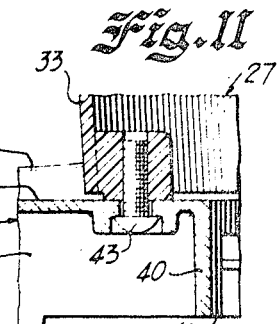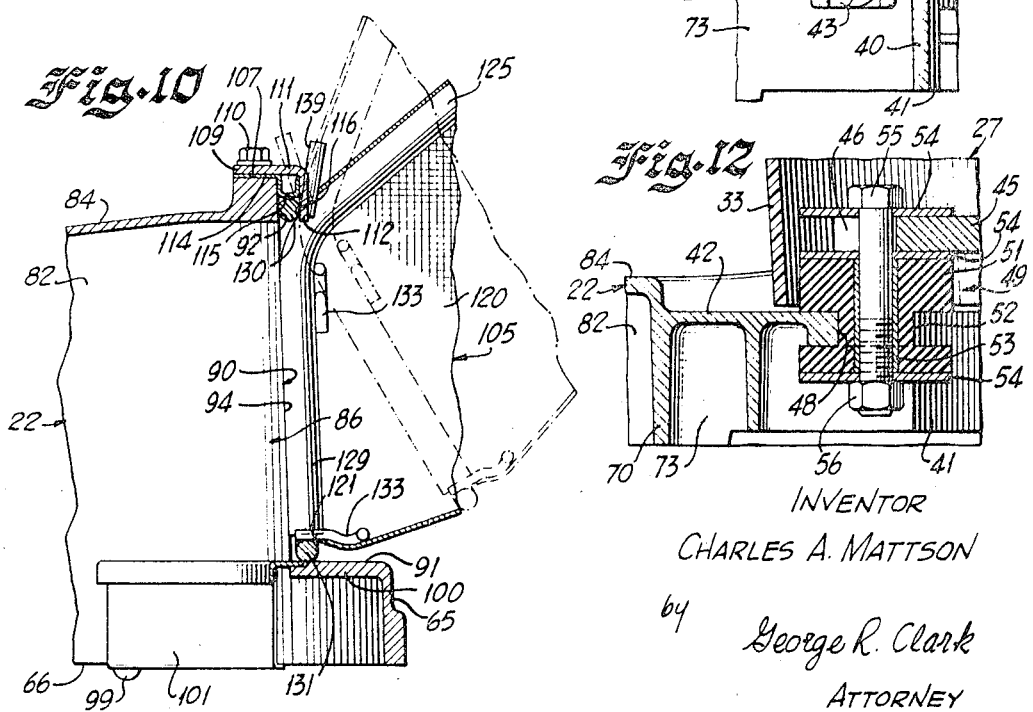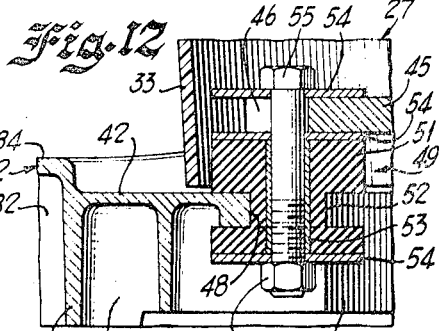

United States Patent Office 3,468,108
Patented Sept. 23, 1969

3,468,108
LAWN MOWER
Charles A. Mattson, Oak Park, Ill., assignor to Sunbeam Corporation, Chicago, Ill., a corporation of Illinois
Filed July 5, 1966, Ser. No. 562,666
Int. Cl. A01d 35/26
U.S. Cl. 56—25.4                                    12 Claims

ABSTRACT OF THE DISCLOSURE

A rotary lawn mower having a housing formed with outer and inner downwardly extending walls which are spaced apart to form a circular channel therebetween. Supported by the housing is a motor provided with a drive shaft to which is secured a cutter having a cutting edge rotatable in the channel and having fan means for forcing grass laden air through a discharge opening defined by the housing. A vertically disposed housing baffle extends across the channel adjacent to the discharge opening for directing the grass laden air therethrough.

The present invention relates to lawn mowers and more particularly to rotary lawn mowers having an improved housing and grass collector.

In recent years, rotary lawn mowers have become very popular. Although the majority of rotary lawn mowers sold in this country employ a gasoline engine, there is a growing demand for rotary lawn mowers powered by electric motors. The rotary type lawn mower conventionally includes an inverted cup-shaped housing provided with a ground engaging wheel at each of the four corners. Either a gasoline engine or an electric motor is mounted on the lawn mower housing with a downwardly extending drive shaft projecting through the upper wall of the housing and supporting at its lower end a rotatable cutter. Prior art mower housings have been designed for use with either gasoline engines or electric motors, and as a consequence, housings designed for gasoline engine power units have not been suitable for use with an electric motor. Obviously, manufacturing problems and costs would be greatly reduced if a single housing design could be used for both gasoline and electric powered rotary lawn mowers. However, the requirements for these two types of rotary mowers are different and it was considered that a single housing design could not efficiently be used for both.

One of the major obstacles for a common housing for both electric and gasoline rotary mowers is that the electric mowers have only a limited amount of power available since they are operated by an electric power cord attached to a conventional 115 volt household circuit which cannot be overloaded. This power limitation presents serious problems in the design of rotary type lawn mowers since more power is consumed in conveying or pumping air through the housing than is consumed in severing grass or other vegetation. In order to minimize the power losses through pumping air, it was considered advantageous to have more than one discharge opening in an electric lawn mower housing to permit the severed grass and air currents to leave the housing as quickly as possible. However, when a gasoline engine is used as the drive means for a rotary lawn mower, much more power is available and it is considered desirable to have a single discharge opening for controlling the direction in which the severed vegetation is expelled. Consequently, a single housing adaptable for both an electric motor and gasoline engine should have a single discharge opening to preserve the advantage inherent with gasoline engine mowers and it should be efficient enough in pumping air so that the electric unit does not draw too much current. In the present invention lawn mower housing, there is provided a combination of design of elements which presents an answer to this problem. The rotary mower housing disclosed hereinafter has a deep channel design with a single discharge opening which is so efficient that either a gas or electric power source can be employed.

Another problem presented by a common housing design for both electric and gasoline rotary mowers is that electric mowers are not normally turned around at the end of each cutting pass but instead employ a flip-over or reversible handle. Gas mowers are conventionally turned around at the end of each cut since they do not have an electric cord to contend with. Since gas mowers are turned around frequently, they usually have a discharge chute which extends laterally from the housing and all close trimming is accomplished at one side of the housing. On the other hand, electric rotary mowers must be able to trim close to an object on both sides of the housing because the mower is not turned around frequently. Furthermore, the grass clippings should be discharged laterally to facilitate the use of a grass collector which is not in the way of the user. Thus, a housing for both gasoline engines and electric motors should permit trimming on both sides of the housing and the grass clippings should be directed laterally. The present invention lawn mower housing accomplishes these objectives and still maintains the required efficiency necessary for a common design for gasoline and electric power sources.

Whether a rotary lawn mower housing is used with an electric motor or a gasoline engine, it is highly desirable to establish a partial vacuum completely around the bottom edge of the housing to induce grass blades entering under the housing to stand upright for ensuring a uniformly cut lawn. This condition is slightly more important for electric rotary mowers since they are normally used to cut in both the front and rear directions. Consequently, a housing for both electric motors and gasoline engines should establish and maintain such a partial vacuum. The present invention housing with its deep channel design effectively sets up such a partial vacuum completely around the periphery of the housing outer depending wall or shirt.

As the rotary lawn mower gains in popularity, there has been an increasing demand for an efficient grass bag which may be used therewith. While the prior art is replete with many different grass catchers designed for use with rotary lawn mowers, these grass catchers are somewhat impractical and difficult to use. It would be highly desirable to have a grass catcher for a rotary lawn mower which may be easily disengaged from the lawn mower housing so that the user may quickly remove the bag when an object lies in the path of the bag. Moreover, it would be advantageous to have the removal of the bag from the lawn mower be in such a manner that the user does not need to lift the total weight of the bag assembly and its contents. Under certain circumstances, objects may be thrown from the discharge opening of a rotary lawn mower, and for safety reasons, it is desirable that the user not stand in front of the discharge opening when removing or attaching the grass catcher. Prior art grass bags for rotary lawn mowers required that the user lift the complete weight of the bag assembly and contents in order to disengage the bag from the lawn mower; and, consequently, since the user has to lift this weight, he is normally in front of the discharge opening. Therefore, it would be a considerable improvement to have a grass bag which could be removed from a rotary lawn mower by merely tilting or pivoting the bag while the user is behind or in the normal operating position with respect to the lawn mower.

Accordingly, it is an object of the present invention to provide a rotary lawn mower which is efficient in operation and may be easily and inexpensively manufactured.

It is another object of the present invention to provide a rotary lawn mower housing adapted for either a gasoline or an electric motor and said housing having a single lateral discharge opening which can trim closely to an object on either side thereof.

Still a further object of the present invention is to provide a rotary lawn mower which efficiently pumps air therethrough and permits a minimum amount of grass clippings to accumulate on the underside of the housing.

An additional object of the present invention is to provide a rotary lawn mower having a housing with a relatively deep channel for conveying air therethrough and with the roof of the channel disposed substantially over the area traveled by the rotatable cutter.

Still another object of the present invention is to provide a grass catcher for a rotary lawn mower which may be easily removed therefrom and which is inexpensive to manufacture.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 2 is a side elevational view of the rotary lawn mower with the handle and grass bag partially broken away for convenience of illustration;

FIG. 3 is a front elevational view with the handle partially illustrated;

FIG. 6 is an enlarged sectional view taken substantially along line 6—6 of FIG. 1;

FIG. 8 is a sectional view taken substantially along line 8—8 of FIG. 1 and illustrates the development or layout of the housing channel when the curved channel is shown in a flat state;

FIG. 9 is a fragmentary sectional view taken substantially along line 9—9 of FIG. 6;

FIG. 10 is an enlarged fragmentary sectional view taken along line 10—10 of FIG. 1;

Figures 1, 7:
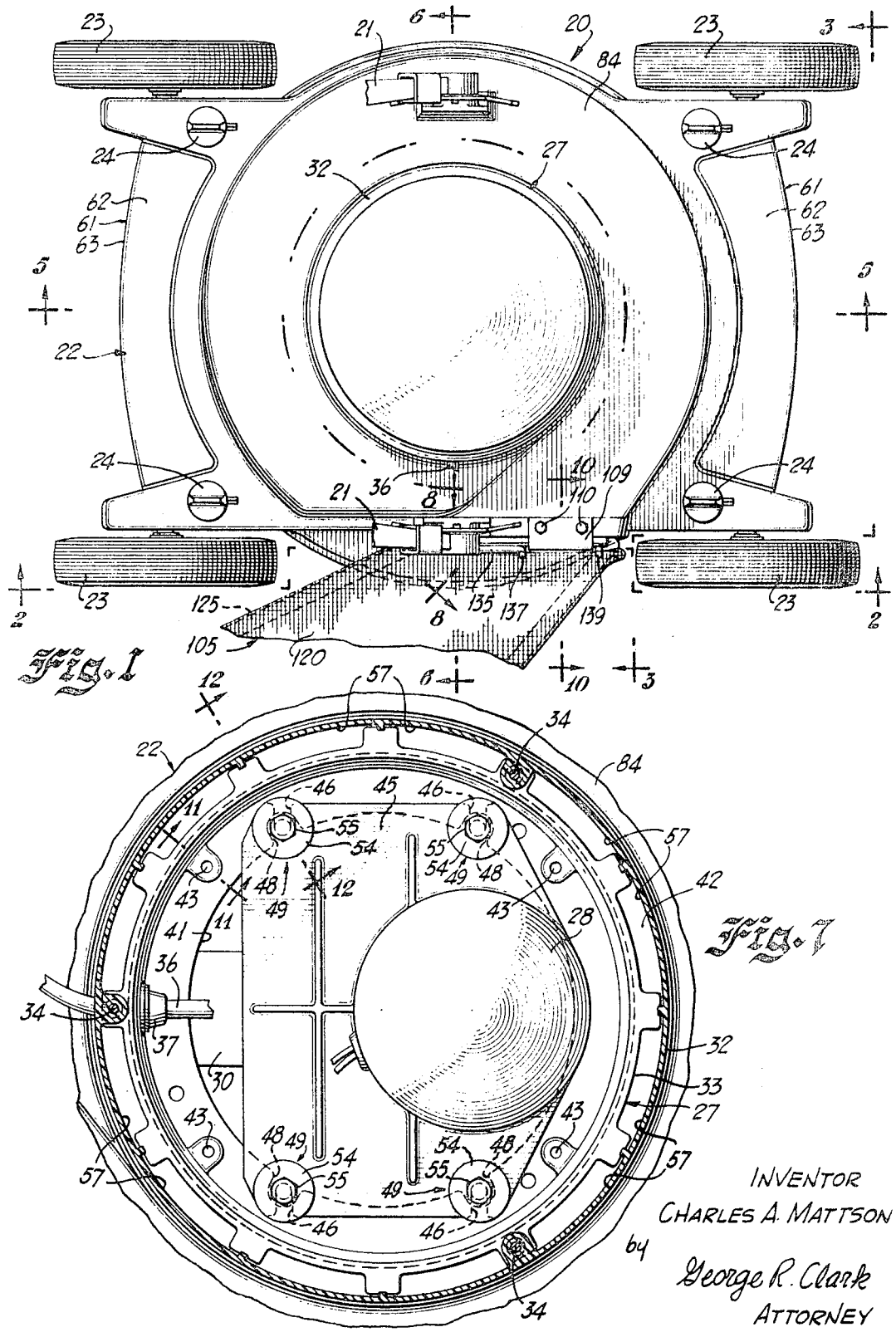
FIG. 1 is a top plan view of a rotary lawn mower embodying my invention with the grass bag and handle partially shown.
FIG. 7 is a fragmentary sectional view taken substantially along line 7—7 of FIG. 6.

FIGS. 11 and 12 are enlarged fragmentary sectional views taken substantially along lines 11—11 and 12—12, respectively, of FIG. 7; and FIG. 13 is a fragmentary view of the lawn mower housing similiar to FIG. 2 but with the grass bag and handle removed.

Briefly, the present invention relates in part to a rotary lawn mower housing suitable for use with a power means including either a gasoline engine or an electric motor. The housing has a downwardly extending substantially cylindrical outer wall and a curved wall disposed within and spaced from the outer wall to form a channel therebetween. The power means has a drive shaft extending downwardly within said inner wall and a cutter is secured thereto having fan means positioned within the channel. The housing outer wall includes a discharge opening disposed substantially above the cutter and the housing forms a roof above the channel connecting the walls. Nearly all of the area of the channel roof is disposed vertically above the area defined by the rotation of the cutter fan means and the channel roof is spaced a considerable distance above the bottom edge of the outer wall so that the channel is relatively deep. A vertical baffle extends across the channel adjacent the discharge opening to insure that the air circulating within the channel makes less than a single revolution before egressing from the discharge opening.

In addition, the present invention relates to a grass bag assembly for a rotary lawn mower wherein the rotary lawn mower housing has a laterally facing discharge opening with a bracket positioned near the top of the opening and a supporting surface near the bottom thereof. The grass bag assembly includes an elongated bag for collecting grass defining an inlet opening at one end thereof and a frame for supporting said bag and adapted for engagement with the lawn mower housing. The frame has an upper member adapted for making a pivotal connection with the bracket and a lower member adapted for engagement with the housing surface when the upper member is in engagement with the bracket. The frame upper member may be disengaged from the bracket when the frame is pivoted through a given angle so that the lower member is no longer in engagement with the housing supporting surface.

Referring to the drawings in which like numerals designate like parts throughout the several views, the rotary lawn mower is designated generally by the reference numeral 20. The lawn mower 20 includes a partially illustrated bifurcated flip-over handle 21 pivotally attached to a housing 22 having supporting wheels 23 at each corner thereof. The elevation of the wheels 23 with respect to the housing 22 is controlled by four mechanisms having a rotatable control knob 24 which mechanisms are described in detail in U.S. Patent No. 3,390,894 which is assigned to the same assignee as in the present application. Preferably, the housing 22 is manufactured using a die casting technique and is integrally formed of either aluminum or magnesium. Either a gasoline engine or an electric motor may be used in connection with the present lawn mower 20. The drawings illustrate the housing 22 carrying an electric motor housing 27 containing an electric motor or power unit 28 having a downwardly extending drive shaft 29 supporting a rotatable cutter 30. Preferably, the housing 27 is molded from a suitable plastic material and is fabricated with an upper section 32 and a lower section 33 held together by a plurality of screws 34. The rotary cutter 30 is locked to the drive shaft 29 by means of nut 31. The pivotal handle 21 receives and carries an electric power cord 36 which passes through strain relief grommet 37 held by the lower housing section 33 and passes therein for an electric connection to the electric motor power leads. The housing 22 forms a centrally disposed vertical collar 40 defining opening 41 through which a portion of the electric motor power unit 28 extends. Surrounding the housing collar 40 is an annular shoulder 42. The electric motor housing 27 is locked to the shoulder 42 by a plurality of screws 43 which extend upwardly from underneath the housing. As may be seen in FIG. 4, apertures 44 are provided in shoulder 42 for locking purposes when a gasoline engine is mounted on the housing 22. The electric motor 28 is provided with a flange 45 having a plurality of notches 46 disposed immediately above a plurality of notches 48 formed in the shoulder 42. Mounting the motor flange 45 to the shoulder 42 and also dampening the vibrations therebetween are a plurality of mounting assemblies 49 including rubber member 51 provided with a reduced diameter portion 52 for interlocking with collar notch 48, steel tube 53, washers 54, bolt 55 and nut 56 as is best shown in FIG. 12.

In order to provide cooling air for electric motor power unit 28, there are a plurality of air inlet openings 57 between upper housing section 32 and lower housing section 33 as shown in FIG. 7. Moreover, the electric motor power unit 28 has air inlet openings at the top thereof (not shown) and air discharge openings 58 located at the lower end of the power unit. Within the power unit 28, there is an armature carrying a fan which forces air from the upper inlet openings of the power unit through the motor and out the outlet openings 58.

Figure 5:
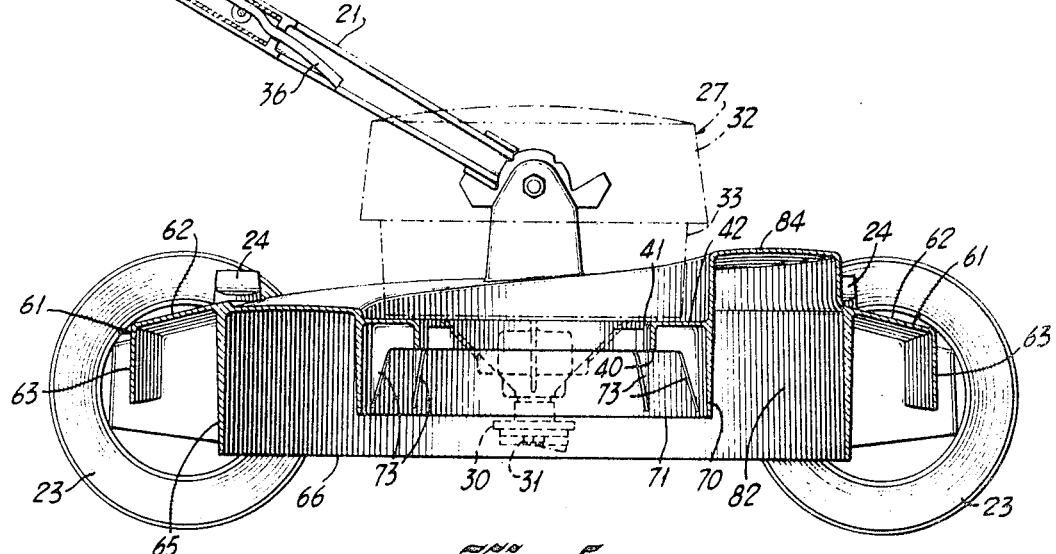
FIG. 5 is a sectional view taken substantially along line 5—5 of FIG. 1 with the electric motor housing and cutter blade shown in broken lines.

Extending transversely across the housing 22 at both the front and rear thereof are integral guards or bumpers 61 having an L-shaped configuration as may be easily seen in FIG. 5. The guards 61 have a substantially horizontally disposed leg 62 which extends outwardly and a substantially vertical leg 63 whose purpose is to prevent the accidental insertion of the user's foot in contact with the cutter 30. In addition, the housing 22 includes a downwardly extending substantially cylindrical outer wall 65 which forms and defines a cutting chamber within which cutter 30 rotates. The outer wall 65 has a bottom edge 66 lying in a horizontal plane. It should be appreciated that the cylindrical outer wall 65 is concentric with the drive shaft 29 and that the cutter 30 extends closely to said wall. Positioned within the outer wall 65 is a downwardly extending inner wall 70 which is concentric with the outer wall and which inner wall has a bottom edge 71 lying in a horizontal plane spaced above from the outer wall bottom edge 66. A plurality of strengthening ribs 73 extend vertically and are integral with collar 40, shoulder 42 and inner wall 70. The cutter 30 is formed with two opposed leading cutting edges 77, fan vanes 78 positioned immediately behind the cutting edges and angled upwardly therefrom and a raised central portion 79. Upon the rotation of cutter 30, the leading cutting edges 77 sever vegetation brought in contact with it, fan vanes 78 force a considerable volume of air upwardly and raised central portion 79 is sufficiently elevated above the height of the cut vegetation that it does not rub thereagainst causing a power loss. It will be appreciated that the cutter 30 passes underneath the inner wall bottom edge 71 and that the cutting edges 77 are disposed above the outer wall bottom edge 66. The outer wall 65 and the inner wall 70 form a somewhat circular channel 82 therebetween and the housing 22 forms a roof 84 enclosing the top of the channel 82. Preferably, the channel 82 has a relatively constant width and in the present embodiment the width is approximately four inches. To adequately handle the air flow within the channel, the width of the channel should not be less than two inches. The channel 82 terminates at a discharge opening 86 in the outer wall 65 defined by inverted U-shaped flange 90 and a substantially horizontal surface 91. The U-shaped flange 90 lies in a vertical plane extending in the direction of travel of the lawn mower and includes an upper horizontal margin 92 and two vertical margins 93 and 94 disposed on each side of the discharge opening 86. A baffle 97 extends across the channel 82 tangentially from the inner wall 70 to the side margin 93. The baffle 97 has a bottom edge 98 which is coplanar with the inner well bottom edge 71. The purpose of baffle 97 is to prevent the air pumped upwardly from the cutter fan vanes 78 from making more than one revolution within channel 82. Consequently, the baffle bottom edge 98 extends relatively closely to the rotating cutter fan vanes 78. Therefore, the rotation of cutter 30 causes the fan vanes 78 to force the air upwardly which increases the air pressure above the fan vanes within the channel 82. Inasmuch as the channel 82 is open at one end due to discharge opening 86, the air is forced around within channel 82 and egresses from the discharge opening 86. A horizontally disposed housing wall 100 having the upper horizontal surface 91 is positioned adjacent the discharge opening 86 at approximately the same elevation as the inner wall bottom edge 71. Inasmuch as the housing 22 is preferably fabricated by a die casting method, it is not practical for the wall 100 to be cast so that it extends inwardly within the housing beyond a plane defined by the U-shaped flange 90. Therefore, a sheet metal extension 101 secured to the housing by means of a plurality of screws 99 is juxtapositioned with surface 91 to effectively extend wall 100 inwardly within the housing a short distance in order to prevent any object hit by the cutter 30 from being hurtled out of the discharge opening 86 before striking the housing 22. It is recognized from a safety standpoint that it is desirable to have the angle of exposure between the outer cutting tip of the rotary cutter and the discharge opening as small as possible and to be definitely less than 30°. The exposure angle is considered to be the angle defined by a horizontal plane containing the outer cutting tip of the cutting edge and a line extending tangentially from the circularly moving tip to the upper edge of the discharge opening. In the lawn mower herein disclosed, the exposure angle is approximately zero and consequently, the likelihood of an object such as a rock being hurtled out of the discharge opening before contacting some portion of the housing is remote. On the other hand, it has been determined by the applicant that it is highly desirable to have the roof 84 of the channel 82 completely exposed above the area defined by the rotation of the fan vanes 78. When the channel roof remains substantially above the cutter fan vanes, the vanes are very effective in pumping air in sufficient volume to clean the roof and thereby lessen the likelihood of grass clippings attaching thereon. Thus, the horizontal housing wall 100 extends inwardly only a distance sufficient to maintain the exposure angle at substantially zero and is sufficiently small so that nearly all of the channel roof 84 lies above the area defined by the rotation of the cutter fan vanes 78. Moreover, it should be appreciated that the discharge opening 86 is substantially recessed inwardly from the periphery of the outer wall 65. Consequently, each side of housing outer wall 65 can come into contact with an object or obstacle on a lawn and the cutter cutting edge 77 can cut sufficiently close to such an object so that a separate trimming operation after mowing is not necessary. Furthermore, for a reason to be discussed hereinafter, a suction or a pressure below atmospheric is maintained beneath the outer wall bottom edge 66 throughout its entirety so that when the outer wall is brought adjacent to an object, the suction tends to draw the grass blades adjacent to the object within the housing and to be severed by the cutting edges 77.

Figure 4:
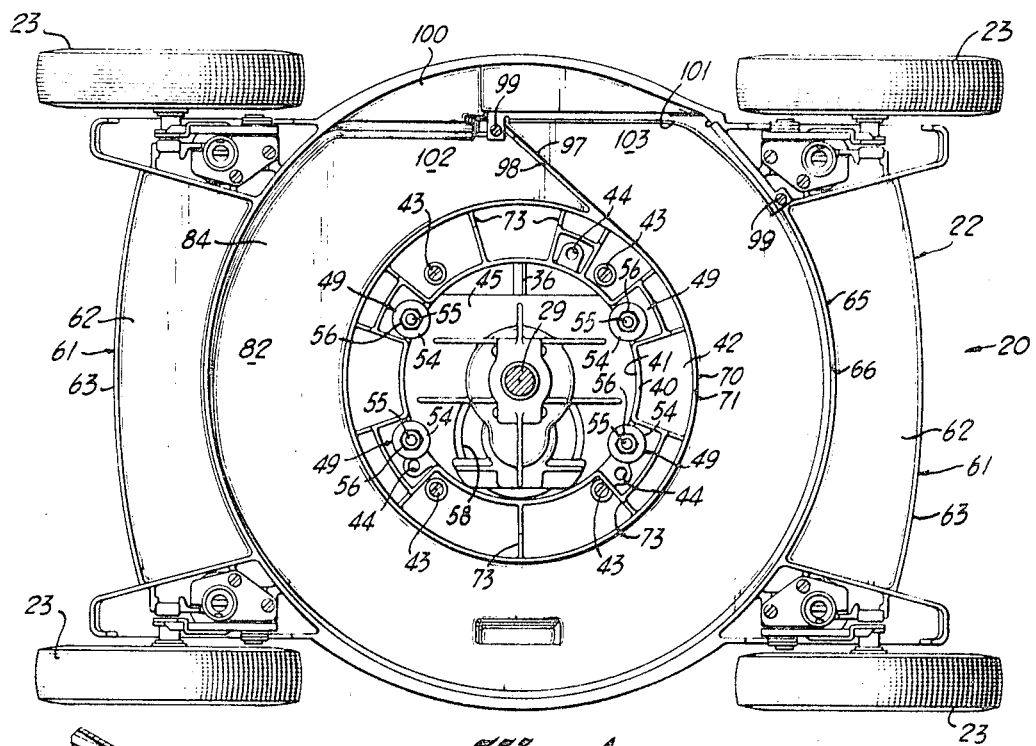
FIG. 4 is a bottom plan view of the rotary lawn mower without the grass bag.

In accordance with the present invention, the channel roof 84 is inclined from an area of low elevation 102 rearwardly from the baffle 97 as viewed in FIG. 4 to an area of high elevation 103 adjacent to the discharge opening 86. As may be seen in FIG. 8 where the channel roof 84 is shown in layout giving the height of the roof in inches and locations in degrees that in the preferred embodiment, the roof rises by more than 2¼" from the low elevation 102 to the area of high elevation 103. The area of low elevation 102 is flattened in order to prevent the roof from extending substantially below the annular shoulder 42 and thereby collect dirt, water and other undesirable material. The high elevational area 103 is likewise flattened and lies in a horizontal plane immediately adjacent the discharge opening 86 to reduce the angle at which severed vegetation is propelled from the discharge opening. However, the portion of roof 84 lying between areas 102 and 103 is uniformly inclined. In order to reduce the power consumption in pumping air with fan vanes 78, the roof 84 lies an appreciable distance above the outer wall lower edge 66 forming a relatively deep channel 82. With this construction, the air pressure immediately above the plane in which the fan vanes 86 rotates is reduced and thereby establishes suction below the entire length of outer wall lower edge 66. Moreover, the severed vegetation which is carried upwardly due to the pumping action of fan vanes 78 has an opportunity to change direction towards the discharge 86 and thus, the impact between the severed vegetation and the channel roof 84 is reduced causing reduced clipping build-up or encrustations on the roof. The height or elevation of the roof increases towards the discharge opening in order to provide an increasing volume for the air being pumped upwardly by the cutter 30. Any increase in the efficiency in handling the air within the housing leaves more power available to either sever grass or as a reserve against the decrease in the power unit efficiency due to wear and tear. Tests have revealed that considerably less power is required with the deep channel design disclosed herein than prior art lawn mower housings employing a shallow channel design. In the preferred working embodiment, the distance between the roof 84 and the outer wall bottom edge 66 is 4.125" for the first 76.6°, gradually increases in height to 6.469" at 315° and remains constant to the discharge opening 86. If the distance between the roof and the bottom of the outer wall is less than three inches, the efficiency of the housing is considerably reduced causing a need for more power to pump the air through the housing.

For collecting the severed grass clippings and vegetation propelled through the discharge opening 86, there is provided a collection bag assembly 105 which is selectively engageable with the lawn mower housing 22. As may be easily seen in FIGS. 10 and 13, the housing 22 has a horizontally extending surface 107 disposed immediately above the discharge opening 86. For the purpose of securing the collection bag assembly 105, the housing 22 has an L-shaped bracket 109 locked to the surface 107 by a plurality of bolts 110 so that bracket leg 111 is attached thereto and bracket leg 112 extends downwardly and is spaced from the U-shaped flange upper margin 92. Inasmuch as the housing 22 may be made in different sizes whereby the height of the discharge opening 82 varies, a spacer 114 having a U-shaped portion 115 is sandwiched between the bracket 109 and the surface 107 whereby the U-shaped portion 115 reduces the depth of bracket recess 116 defined by margin 92 and leg 112. The spacer 114 is not needed for decks of a smaller size where the distance from a comparable surface 91 to leg 111 is approximately the same distance between the bottom of spaced U-shaped portion 115 to surface 91.

In accordance with the present invention, the collection bag assembly 105 comprises an elongated porous bag 120 having an opening 121 at one end to receive grass clippings and a zipper at the opposite end (not shown) to assist in the removal of grass clippings from the bag 120. Preferably, the bag 120 is made from porous fabric which allows air to easily pass therethrough. Consequently, the large volume of air emanating from the discharge opening 86 and entering into the bag 120 easily passes through the bag fabric while the clippings remain therein. Supporting the bag 120 is a rigid frame 123 including an upper U-shaped rod 124 which is slidably received in the frame lower portion 125. It is preferable that the frame be made in two pieces to facilitate the shipment of the frame 123 and the bag 120. The frame lower portion 125 defines a rectangular opening 126 by two spaced vertically extending side members 128 and 129 and by spaced horizontally extending upper and lower members 130 and 131. A plurality of projections 133 are attached to the frame lower portion 125 around the rectangular opening 126 for securing the bag opening 121 adjacent to the rectangular opening 126. For the purpose of holding the bag opening 121 in its proper position, it is preferable that an elastic band be disposed within the bag around the opening to cause the bag to fasten itself to the projections 133. The members 128 through 131 may be made from circular steel rods and may be rigidly locked together by welding. Attached to the upper member 130 is rod 135 having upturned ends 136 and 137. The rod 135 is juxtapositioned with member 130 and extends therewith for over half the length of the member 130. In addition, an upwardly directed projection 139 is secured by any suitable manner such as welding to the member 130 near the end thereof adjacent to member 129. As may be seen in FIGS. 2 and 10, member 130 is insertable into bracket recess 116 between the rod upturned end 137 and the projection 139. When the member 130 is received within the recess 116, the bag may be pivoted with respect to the housing 22. The member 130 is inserted into the recess 116 by having the member 130 positioned below the recess and then raising the member. As the frame 123 is pivoted downwardly, the side members 128 and 129 abut the side margins 93 and 94 respectively, and member 131 rests on the horizontal housing surface 91 as illustrated in FIG. 10 in solid lines. In this position, the grass bag opening 121 is in register with the discharge opening 86 and consequently, can receive any material emanating therefrom. It should be appreciated that the weight of the frame 123, bag 120 and any material contained therein tends to pivot the collection bag assembly 105 downwardly or into a locked position. For the purpose of affording better contact between the lower member 131 and housing surface 91, the member 131 is shaped with a horizontally extending V-shaped portion 141 as may be seen in FIG. 9. To facilitate the handling of collection bag assembly 105, the bag 120 is fabricated with a strap 143 which may be conveniently grasped by the user.

While operating the lawn mower if the path of bag assembly 105 would strike an obstacle, the user merely pivots the assembly by raising the strap 143 causing the lower member 131 to pivot outwardly through a given angle until it clears the housing surface 91 as illustrated in broken lines in FIG. 10 whereupon the assembly automatically drops downwardly disengaging member 130 from bracket recess 116 thereby severing the connection between the grass bag assembly 105 and the lawn mower housing 22. Thus, the user, by merely pivoting the bag, can quickly disengage the bag assembly from the mower. It should be appreciated that it is not necessary for the user to lift the full weight of the bag assembly and contents therein to effect disengagement. Since the pivotal movement required to disengage the bag assembly from the mower may easily be accomplished by one hand of the user, it is not necessary for the user to move from his operating position behind the mower and consequently, the user does not need to stand in front of the discharge opening and in the path of objects emanating therefrom. In order to insert the bag assembly back onto the lawn mower, the member 130 is positioned within bracket recess 116 and the frame 123 is pivoted downwardly until the frame abuts against the side margins 93 and 94 and the horizontal surface 91. Therefore, the bag assembly is easily removed with a single movement which does not require the user to bear the full weight of the bag assembly and contents and it is not necessary for the user to position himself in front of the discharge opening in order to effect an engagement or disengagement between the bag assembly and the housing.

While there has been illustrated and described a particular embodiment of the present invention, it will be understood that changes and modifications may occur to those skilled in the art.

What is claimed as new and desired to be obtained by Letters Patent of the United States is:

1. In a rotary lawn mower comprising a housing having a downwardly extending substantially cylindrical outer wall and a downwardly extending curved inner wall disposed within and spaced from said outer wall forming a channel therebetween, power means mounted on said housing and being provided with a downwardly extending drive shaft, said shaft extending within said inner wall, a cutter secured to said shaft and having a cutting edge disposed below the bottom of said inner wall and disposed above the bottom of said outer wall whereby the rotation of said cutter by said power means causes said edge to define a circular horizontal area, said cutter including fan means positioned between said walls for pumping air upwardly and along said channel in the same direction as said cutter rotates, said outer wall defining a discharge opening disposed substantially above the area defined by the rotation of said cutting edge, said housing including a roof above said channel and connected with said walls, said roof being inclined upwardly in the same direction as said cutter rotates, substantially all of the area of said roof being disposed vertically above the area generated by said cutting edge, said roof being more than three inches above the bottom of said outer wall, said housing being provided with a vertical baffle extending across said channel from said roof to immediately above the horizontal area defined by the rotation of said cutter edge, said baffle positioned adjacent said discharge opening for directing the air pumped by said fan means through said discharge opening.

2. In the rotary lawn mower of claim 1 wherein said housing including a substantially horizontal wall adjacent said discharge opening extending from near the bottom of said discharge opening to said outer wall for reducing the exposure of said cutting edge through said discharge opening.

3. In the rotary lawn mower of claim 1 wherein said discharge opening being positioned above the bottom of said outer wall.

4. In the rotary lawn mower of claim 3 wherein said walls are substantially cylindrical and concentric so that the distance between said walls is substantially constant, said roof being substantially flat in the radial direction and inclined in the circular direction so that it rises from the lowest elevation to the highest elevation by more than one inch.

5. A rotary lawn mower comprising a housing having an outer and inner downwardly extending circular wall, said walls being concentrically disposed and forming a channel therebetween, a discharge opening formed in said outer housing wall, a baffle extending across said channel between said inner wall and adjacent said discharge opening, a power means carried by said housing and having a drive shaft extending downwardly within said inner wall, a cutter secured to said drive shaft and disposed at an elevation slightly above the bottom of said outer wall and slightly below the bottom of said inner wall, said cutter provided with fan means between said walls whereby rotation of said cutter causes air to circulate within said channel and egress through said discharge opening, said housing forming a roof over said channel and being inclined so that the low elevation of said roof is adjacent said baffle and the high elevation is near said discharge opening, the low elevation of said roof being spaced a considerable distance above the bottom of said outer housing wall whereby the vegetation severed by the rotation of said cutter is carried upwardly due to the pumping action of said fan means and there is sufficient room above said cutter for facilitating the changing the direction of movement of the severed vegetation toward said discharge opening prior to impact with said roof.

6. The rotary lawn mower of claim 5 wherein the distance between said low elevation of said roof and the bottom of said outer housing wall is greater than three inches.

7. The rotary lawn mower of claim 6 wherein said roof is horizontally disposed adjacent said discharge opening for reducing the angle at which the severed vegetation leaves said discharge opening.

8. The rotary lawn mower of claim 6 wherein said housing includes a horizontal wall near the bottom of said discharge opening extending above said cutter.

9. The rotary lawn mower of claim 6 wherein said housing roof rises more than two inches between said low and high elevations and said channel is more than two inches wide.

10. The rotary lawn mower of claim 6 wherein said baffle extends tangentially from said circular inner wall to adjacent said discharge opening and extends downwardly to the bottom of said inner wall.

11. The rotary lawn mower of claim 6 wherein a bracket secured to said housing above said discharge opening, a grass catcher including a bag and a rigid frame supporting said bag, said frame being adapted for pivotal engagement with said bracket and having a horizontal member disposed for engagement with said housing horizontal wall.

12. The rotary lawn mower of claim 11 wherein said bag has an opening for receiving clippings from said housing, said frame supporting said bag so that said bag opening is in fluid engagement with said discharge opening when said frame is in engagement with said bracket and horizontal wall.

References Cited
UNITED STATES PATENTS

| | | | |
|---|---|---|---|
| 3,150,479 | 9/1964 | Wolf | 56—25.4 |
| 3,178,872 | 4/1965 | Swindler | 56—25.4 |
| 3,192,692 | 7/1965 | Slemmons | 56—25.4 |
| 3,220,170 | 11/1965 | Smith et al. | 56—25.4 |

ANTONIO F. GUIDA, Primary Examiner